(12) United States Patent
Chow et al.

(10) Patent No.: US 11,142,175 B2
(45) Date of Patent: Oct. 12, 2021

(54) BRAKE SUPPLEMENT ASSIST CONTROL

(71) Applicant: Toyota Motor Engineering & Manufacturing North America, Inc., Plano, TX (US)

(72) Inventors: Justin J. Chow, Ann Arbor, MI (US); Benjamin M. Geller, Ann Arbor, MI (US); Abril A. Galang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 396 days.

(21) Appl. No.: 16/241,829

(22) Filed: Jan. 7, 2019

(65) Prior Publication Data
US 2020/0216044 A1 Jul. 9, 2020

(51) Int. Cl.
| B60T 8/171 | (2006.01) |
| B60T 8/32 | (2006.01) |
| B60T 7/04 | (2006.01) |
| B60T 7/12 | (2006.01) |
| B60T 13/68 | (2006.01) |
| B60T 13/66 | (2006.01) |
| B60T 13/74 | (2006.01) |
| B60T 7/22 | (2006.01) |
| B60T 7/18 | (2006.01) |

(52) U.S. Cl.
CPC .............. *B60T 8/171* (2013.01); *B60T 7/042* (2013.01); *B60T 7/12* (2013.01); *B60T 8/3275* (2013.01); *B60T 13/662* (2013.01); *B60T 13/68* (2013.01); *B60T 13/74* (2013.01); *B60T 2201/022* (2013.01); *B60T 2201/03* (2013.01)

(58) Field of Classification Search
CPC ........ B60T 8/171; B60T 8/3275; B60T 7/042; B60T 7/12; B60T 13/68; B60T 13/662; B60T 2201/022; B60T 2201/03; B60T 13/74; B60T 2201/06; B60T 7/22; B60T 7/18
See application file for complete search history.

(56) References Cited

U.S. PATENT DOCUMENTS

| 5,457,363 A | 10/1995 | Yoshii et al. |
| 6,424,895 B1 | 7/2002 | Shimizu et al. |
| 7,861,838 B2 | 1/2011 | Ohtake et al. |
| 7,957,856 B2 | 7/2011 | Itoh |
| 8,126,625 B2 | 2/2012 | Makino et al. |
| 8,160,763 B2 | 4/2012 | Tamai et al. |

(Continued)

*Primary Examiner* — Frederick M Brushaber
(74) *Attorney, Agent, or Firm* — Snell & Wilmer LLP

(57) ABSTRACT

Methods, systems, and apparatus for a brake assist control system. The brake assist control system is for a vehicle. The brake assist control system includes a first sensor configured to detect driver awareness. The brake assist control system includes an electronic control unit. The electronic control unit is coupled to the first sensor. The electronic control unit is configured to determine that a brake pedal and an accelerator pedal are in a released position. The electronic control unit is configured to determine that there is vehicle movement. The electronic control unit is configured to determine that a driver of the vehicle is unaware of the vehicle movement based on the driver awareness. The electronic control unit is configured to reduce or eliminate the vehicle movement.

20 Claims, 5 Drawing Sheets

(56) References Cited

U.S. PATENT DOCUMENTS

| | | |
|---|---|---|
| 8,958,944 B2 | 2/2015 | Jung et al. |
| 9,205,816 B2 | 12/2015 | Kobana et al. |
| 9,327,709 B2 | 5/2016 | Wang et al. |
| 9,663,108 B2 | 5/2017 | Heisel |
| 9,855,932 B2 | 1/2018 | Kato |
| 2004/0017106 A1* | 1/2004 | Aizawa ............... B60T 7/12 303/191 |
| 2005/0270177 A1* | 12/2005 | Mori ............... G08G 1/166 340/932.2 |
| 2013/0197731 A1 | 8/2013 | Schum et al. |
| 2016/0311437 A1 | 10/2016 | Tabuchi |
| 2017/0028966 A1* | 2/2017 | Elie ............... B60K 28/12 |
| 2017/0113700 A1 | 4/2017 | Kaneko et al. |
| 2017/0151936 A1* | 6/2017 | Takase ............... B60T 8/171 |
| 2017/0291506 A1 | 10/2017 | Yim et al. |
| 2019/0349470 A1* | 11/2019 | Abramson ............ H04W 4/50 |

* cited by examiner

BRAKE SUPPLEMENT ASSIST CONTROL

BACKGROUND

Field

This disclosure relates to detecting, preventing or otherwise controlling vehicle movement.

Description of the Related Art

In various situations the driver of a vehicle may intend to park or stop the vehicle but not apply the brakes. When the vehicle is in the drive mode or position and the driver of the vehicle does not apply the brakes, the vehicle may continue to creep or move forward because of creep torque. For example, the driver may drive up to a curb in front of an establishment or a place of business, stop the vehicle but forget to place the vehicle in the park position, and consequently, the vehicle may creep or move forward because of creep torque. This may present a hazard to the driver or others near the vehicle. In another example, the driver may drive up to a stop sign and intentionally release the brake pedal to creep or move forward to obtain a better view of any cross-traffic.

Some vehicles engage the emergency brake when the brake pedal is not applied and the driver is not ready to drive. However, by engaging the emergency brake, the emergency brake or the engine of the vehicle may be damaged as the vehicle attempts to creep or move forward. For example, as the emergency break is applied, a parking pawl may be engaged to a gear within the transmission, and if the vehicle continues to move forward, strain may be placed on the gear. Lastly, if the emergency brake is engaged, the driver may forget to disengage the emergency brake when the driver subsequently applies the accelerator pedal.

Accordingly, there is a need for a system and a method for reducing or eliminating vehicle movement when the vehicle is not in the park position and the driver is unaware of the vehicle movement.

SUMMARY

In general, one aspect of the subject matter described in this disclosure may be embodied in a brake assist control system. The brake assist control system includes a first sensor configured to detect driver awareness. The brake assist control system includes an electronic control unit. The electronic control unit is coupled to the first sensor. The electronic control unit is configured to determine that a brake pedal and an accelerator pedal are in a released position. The electronic control unit is configured to determine that there is vehicle movement. The electronic control unit is configured to determine that a driver of the vehicle is unaware of the vehicle movement based on the driver awareness. The electronic control unit is configured to reduce or eliminate the vehicle movement.

These and other embodiments may optionally include one or more of the following features. The brake assist control system may include a brake pedal sensor coupled to the brake pedal. The brake pedal sensor may be configured to detect a position of the brake pedal. The brake assist control system may include an accelerator pedal sensor coupled to the accelerator pedal. The accelerator pedal sensor may be configured to detect a position of the accelerator pedal. The electronic control unit may be configured to determine that the brake pedal and the accelerator pedal are in the released position based on the position of the brake pedal and the position of the accelerator pedal, respectively.

The brake assist control system may include a second sensor. The second sensor may include at least one of an engine sensor, a vehicle speed sensor or a wheel sensor. The engine sensor may be configured to detect an applied torque or power to an engine of the vehicle. The vehicle speed sensor may be configured to detect a speed of the vehicle. The wheel sensor may be configured to detect movement of the wheel of the vehicle. The electronic control unit may be configured to determine that the vehicle is creeping or moving forward based on the applied torque or power to the engine, the speed of the vehicle or the movement of the wheel of the vehicle.

The first sensor may be a door sensor. The door sensor may be configured to detect that a door of the vehicle is ajar. The electronic control unit may be further configured to determine that the door of the vehicle is ajar to determine that the driver of the vehicle is unaware of the vehicle movement.

The brake assist control system may include a navigation unit. The navigation unit may be configured to detect a current location of the vehicle and one or more stop events. The electronic control unit may be configured to determine that the current location of the vehicle is within a threshold distance of the one or more stop events. The electronic control unit may be configured to determine that there is vehicle movement when the vehicle is within the threshold distance of the one or more stop events.

The brake assist control system may include a second sensor. The second sensor may be configured to detect an incline or an angle of a roadway. The electronic control unit may be configured to reduce or eliminate any applied torque or apply a negative torque when the incline or the angle of the roadway is greater than a threshold angle. The electronic control unit may be configured to determine that the vehicle is not in a park position based on a position of a transmission of the vehicle.

In another aspect, the subject matter may be embodied in a brake assist control system. The brake assist control system includes a brake pedal and an accelerator pedal. The brake assist control system includes a brake pedal sensor coupled to the brake pedal and configured to detect a position of the brake pedal. The brake assist control system includes an accelerator pedal sensor coupled to the accelerator pedal and configured to detect a position of the accelerator pedal. The brake assist control system includes a transmission and a first sensor configured to detect driver awareness. The brake assist control system includes an electronic control unit coupled to the brake pedal sensor, the accelerator pedal sensor and the first sensor. The electronic control unit is configured to determine that the brake pedal and the accelerator pedal are in a released position based on the detected position of the brake pedal and the detected position of the accelerator pedal, respectively. The electronic control unit is configured to determine that there is vehicle movement and that the transmission is in a drive position. The electronic control unit is configured to determine that a driver of the vehicle is unaware of the vehicle movement based on the driver awareness and reduce or eliminate the vehicle movement.

In another aspect, the subject matter may be embodied in a method for controlling vehicle movement of a vehicle. The method includes determining, by a processor and using a brake pedal sensor, that a brake pedal is in a released position. The method includes determining, by the processor and using an accelerator pedal sensor, that an accelerator pedal is in a released position. The method includes determining, by the processor, that the vehicle is in a drive position and that there is vehicle movement. The method includes determining, by the processor and using a sensor, that a driver of the vehicle is unaware of the vehicle movement. The method includes reducing or eliminating, by the processor, the vehicle movement.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles and methods for controlling vehicle movement. Particular embodiments of the subject matter described in this disclosure may be implemented to realize one or more of the following advantages. The brake assist control system detects when a driver is unaware of his or her environment or surrounding and/or not paying attention to controlling the vehicle. The brake assist control system may monitor various factors, such as the eyes of the driver, the position of the hands of the driver, the position of the door or the seatbelt or other factors, to determine whether the driver is aware of his or her surroundings and in control of the vehicle. The brake assist control system initiates a negative torque, reduces the creep torque, and/or eliminates the creep torque to reduce, prevent or eliminate the vehicle movement when the brake pedal is disengaged and the vehicle is not in the park position. This prevents, reduces or eliminates vehicle movement when the driver does not intend to creep or move forward and/or when the driver is not in control of the vehicle.

Other benefits and advantages include the capability to adjust the amount the creep torque is reduced or eliminated and/or the amount of negative torque that is applied. The brake assist control system may measure or determine external factors that may affect the vehicle movement, such as the incline or the angle of the roadway that the vehicle is on, and adjust the amount of negative torque that is applied and/or adjust the amount of creep torque that is reduced or eliminated. The brake assist control system may detect other vehicles in front of or in proximity of the vehicle and adjust the amount of creep torque to minimize impact to the other vehicle.

Additionally, the brake assist control system may predictively engage or initialize to differentiate when a driver intends to creep forward or does not intend to creep forward. The brake assist control system may identify or determine locations where a driver may intend to creep forward, such as at a stop sign when no other vehicle is in front of the vehicle, and does not intend to creep forward, such as a curbside near an airport. This allows the driver to advantageously utilize creeping forward while simultaneously preventing unintended creep where the vehicle may roll away.

Figure 1:
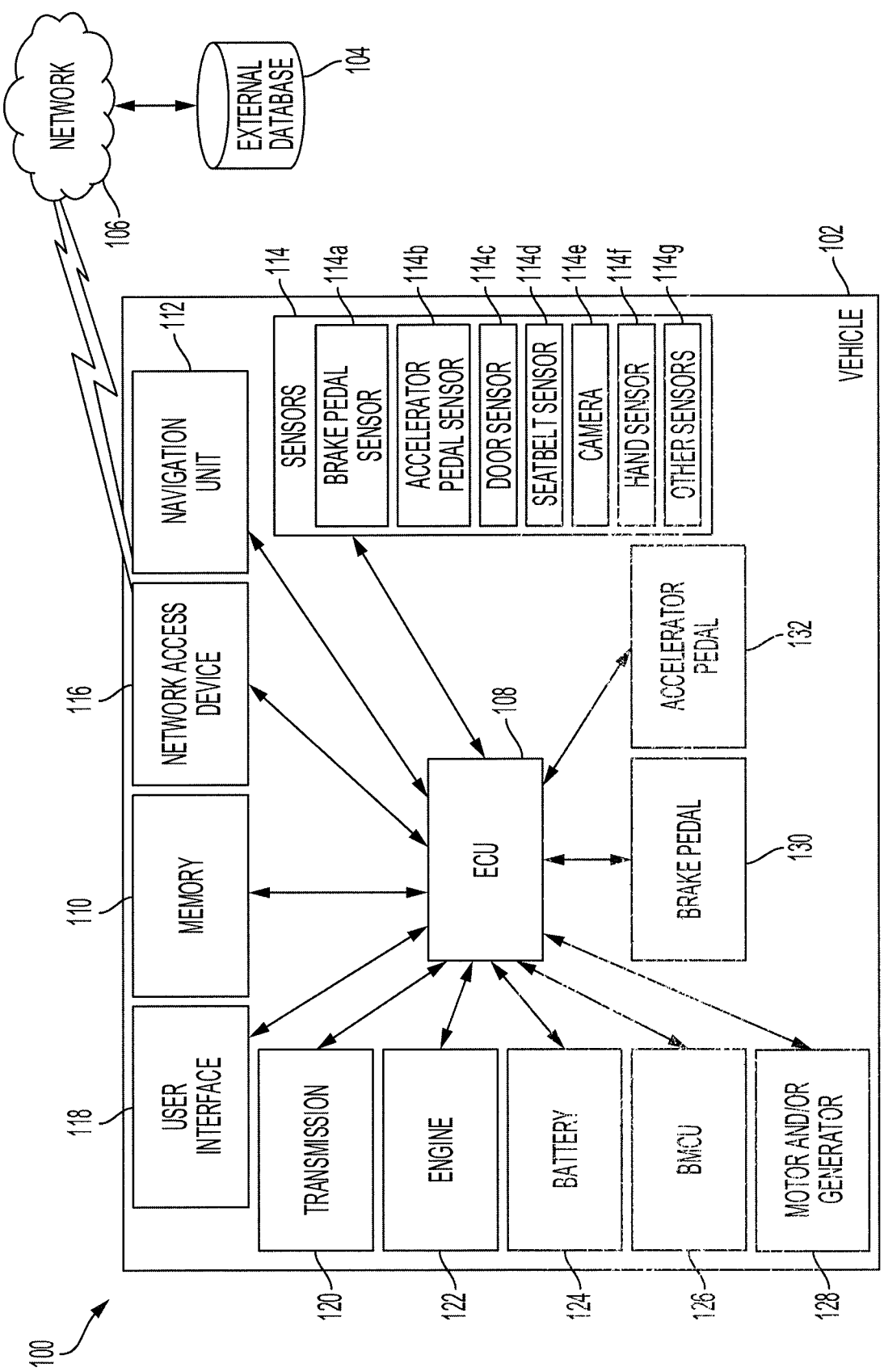
FIG. 1 is a block diagram of an example brake assist control system according to an aspect of the invention.

FIG. 1 is a block diagram of a brake assist control system 100. The brake assist control system 100 may be retro-fitted, coupled to, include or be included within a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The brake assist control system 100 may couple, connect to, or include an external database 104. The brake assist control system 100 may use the external database 104 to obtain one or more locations of stop events. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a transportation database that tracks, stores and/or maintains the location, category, type and/or other information of one or more stop events. A stop event may be a place of business, a residence, a traffic signal, sign or other traffic infrastructure, or other location or place where a driver of the vehicle may stop, potentially stop, wait or slow the vehicle 102. For example, the stop event may be a stop sign, a traffic signal, or other signal or sign that causes the driver to stop or potentially stop the vehicle 102. In another example, the stop event may be a curbside at an airport where a driver drops-off or picks-up a passenger.

The external database 104 may be updated and/or provide updates in real-time. The external database 104 may store and/or provide information regarding the stop event, such as the locations of one or more stop events, a description, a category or a type of the one or more stop events, and/or other information. The other information may include the incline, the grade or the angle of the roadway in proximity to the stop event, for example. The external database 104 may store and/or provide weather information including the temperature, the weather, the road conditions, the amount of precipitation and/or other weather factors that may affect the amount of negative torque necessary to prevent the vehicle 102 from moving on a roadway.

The brake assist control system 100 may have or use a network 106 that links the external database 104 with the brake assist control system 100. The brake assist control system 100 may obtain information, such as the locations of the one or more stop events, from the external database 104 via the network 106. The network 106 may be a local area network (LAN), a wide area network (WAN), a cellular network, the Internet, or combination thereof, that connects, couples and/or otherwise facilitates communication among the vehicle 102, the external database 104 and/or the brake assist control system 100.

The brake assist control system 100 includes one or more processors, such as an electronic control unit (ECU) 108, a memory 110 and/or one or more sensors 114. The brake assist control system 100 may include other components, such as a navigation unit 112, a user interface 118 and/or a network access device 116. The brake assist control system 100 may include, be coupled to, or otherwise be connected to one of more vehicle components. The one or more vehicle components may include the transmission 120, the engine 122, the battery 124, the battery management control unit (BMCU) 126, the motor and/or generator 128, the brake pedal 130 and/or the accelerator pedal 132.

The brake assist control system 100 includes one or more processors, such as an electronic control unit (ECU) 108 and a memory 110. The ECU 108 may be implemented as a single ECU or as multiple ECUs. The ECU 108 may be electrically coupled to some or all the other components including one or more vehicle components within the vehicle 102. The ECU 108 may include one or more processors or controllers specifically designed for sensing, detecting, measuring and/or otherwise determining or obtaining driver awareness information, navigational map information or other sensor information related to vehicle movement, driver awareness, vehicle location and/or one or more stop events. The ECU 108 may determine or detect vehicle movement when the vehicle is not in the park position and the brake pedal is not depressed, and the ECU 108 may alert the driver of the vehicle movement and/or reduce, eliminate or prevent the vehicle movement when the driver is unaware of the vehicle movement. The unawareness may be a result of driver distraction, forgetfulness or other intentional or non-intentional action of the driver where the driver does not intend for the vehicle movement.

The memory 110 may be coupled to the ECU 108 and store instructions that the ECU 108 executes. The memory 110 may include one or more of a Random-Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108.

The brake assist control system 100 may include a user interface 118. The brake assist control system 100 may display one or more notifications on the user interface 118. The one or more notifications on the user interface 118 may notify or warn the driver of the vehicle that the brake assist control system 100 is applying a negative torque or reducing the creep torque to control creep torque. The user interface 118 may include an input/output device that receives user input, such as a user interface element, a button, a dial, a microphone, a keyboard, or a touch screen, and/or provides output, such as a display, a speaker, an audio and/or visual indicator, or a refreshable braille display.

The brake assist control system 100 may include a network access device 116. The network access device 116 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 116 may transmit data to and receive data from the external database 104, for example.

The brake assist control system 100 may include navigation unit 112 and/or one or more sensors 114. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 116. In some implementations, the vehicle 102 may include a Global Positioning System (GPS) unit (not shown) for detecting location data and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations.

The navigation unit 112 may provide and obtain navigational map information based on the detected location data, which may include a current location, a starting location, a destination location and/or a route between the starting location or current location and the destination location of the vehicle 102 and may include a memory (not shown) for storing route data. The navigation unit 112 may receive data from other sensors capable of detecting data corresponding to location information. For example, the other sensors may include a gyroscope or an accelerometer.

The navigation unit 112 may provide or obtain navigational map information. The navigational map information may include roadway information. The roadway information may indicate one or more locations of stop events, such as places of business, residences, transportation hubs, stop signs, traffic signals and/or other places a driver of the vehicle 102 may stop, wait or slow the vehicle 102. The roadway information includes the location, the category or the type, or other description of the stop event. The roadway information may include additional information related to the stop event, such as the angle or incline of the roadway near or in proximity to the stop event.

The one or more sensors 114 may include a brake pedal sensor 114a and/or an accelerator pedal sensor 114b. The brake pedal sensor 114a measures or detects a position of the brake pedal 130. The position of the brake pedal 130 may range from a released position where the brake pedal 130 is not depressed to an engaged position where the brake pedal 130 is fully depressed, which causes the vehicle 102 to stop. Similarly, the accelerator pedal sensor 114b measures or detects a position of the accelerator pedal 132, and the position of the accelerator pedal 132 may range from a released position where the accelerator pedal is not depressed to an engaged position where the accelerator pedal 132 is fully depressed, which causes the vehicle 102 to achieve maximum acceleration.

The one or more sensors 114 may include a door sensor 114c, a seatbelt sensor 114d, a camera 114e or a hand sensor 114f. These sensors may be designed to determine, detect or analyze driver awareness and provide driver awareness information. The driver awareness information may include information that relates to a driver's attentiveness to the road as the vehicle 102 moves. For example, the door sensor 114c may detect a position of the door of the vehicle 102 and determine whether the door of the vehicle 102 is open, partially open or closed. Moreover, the door sensor 114c may detect when the door of the vehicle 102 is ajar or otherwise not fully closed. When the door is ajar, this may indicate that the driver or occupant of the vehicle 102 is not in a position or ready to operate the vehicle 102 because the driver may be in the process of exiting, entering or situating oneself within the vehicle 102. Similarly, in another example, the seatbelt sensor 114d may detect whether a seatbelt is engaged or buckled. When the seatbelt sensor 114d detects that the seatbelt of the driver of the vehicle is not engaged, unbuckled and/or has been disengaged, which may indicate that the driver of the vehicle is not ready to or does not intend to operate or control the vehicle 102.

In some implementations, the one or more sensors 114 detect that the attention of the driver of the vehicle 102 is focused on the road. For example, the camera 114e may collect, obtain or otherwise determine image data. The brake assist control system 100 may use the image data to analyze eye positions of the driver of the vehicle 102 to ensure that the driver of the vehicle 102 is looking forward toward the roadway. When the eye positions of the driver of the vehicle 102 are facing toward the roadway, one of the mirrors or other position that indicates that the driver is aware of the surroundings, the brake assist control system 100 may determine that the driver is aware of and in control of any vehicle movement. In another example, one or more hand sensors 114f may be positioned on the steering wheel and obtain or determine hand positions of the driver. And, when two hands are positioned on the steering wheel, the brake assist control system 100 may determine that the driver is aware of any vehicle movement. Contrast, when eye positions indicate that the driver is drowsy, wandering or otherwise not focused on the roadway or the surroundings and/or when two hands are not on the steering wheel, the brake assist control system 100 may determine that the driver is unaware of the vehicle movement.

The one or more sensors 114 may include other sensors 114g, such as a vehicle speed sensor, a road incline sensor, an engine sensor, a load sensor, a proximity sensor or other sensor. The vehicle speed sensor may measure or detect an amount of vehicle speed to determine whether there is vehicle movement. The engine sensor may measure or detect an amount of applied torque. The road incline sensor may measure or detect a grade, an angle or an incline of a surface of a roadway that the vehicle 102 is on or traversing. The proximity sensor may measure a relative distance between the vehicle 102 and another vehicle or object in front of or behind the vehicle 102, for example. The load sensor may be positioned on a seat of the vehicle 102 and may measure a load on the seat, which may be used to determine the presence of an occupant or a driver, for example.

The brake assist control system 100 may couple, connect to, and/or include one or more vehicle components. The one or more vehicle components may include a transmission 120. The transmission 120 provides a controlled application of power. The transmission 120 adapts the output of the engine 122 to drive the wheels of the vehicle 102 and has various gears, positions or modes, such as a park position, a drive position, or other gear positions to control the direction, the speed and the amount of torque of the motor output.

The one or more vehicle components may include a motor and/or generator 128. The motor and/or generator 128 may convert electrical energy into mechanical power, such as torque, and may convert mechanical power into electrical energy. The motor and/or generator 128 and may be coupled to the battery 124. The motor and/or generator 128 may convert the energy from the battery 124 into mechanical power, and may provide energy back to the battery 124, for example, via regenerative braking. In some implementations, the vehicle 102 may include one or more additional power generation devices such as the engine 122 or a fuel cell stack (not shown). The engine 122 combusts fuel to provide power instead of and/or in addition to the power supplied by the motor and/or generator 128.

The battery 124 may be coupled to the motor and/or generator 128 and may provide electrical energy to and receive electrical energy from the motor and/or generator 128. The battery 124 may include one or more rechargeable batteries.

The BMCU 126 may be coupled to the battery 124 and may control and manage the charging and discharging of the battery 124. The BMCU 126, for example, may measure, using battery sensors, parameters used to determine the state of charge (SOC) of the battery 124. The BMCU 126 may control the battery 124 to maintain a reserve power explicitly for providing a sudden burst of electrical energy to be converted into power for the transmission to drive or move the multiple wheels of the vehicle 102.

The one or more vehicle components may include the brake pedal 130. The brake pedal 130 may be depressed to stop, reduce or slow the speed of the vehicle 102. When the brake pedal 130 is in the released position, i.e., not depressed, and the vehicle 102 is not in the park position, the vehicle 102 may creep or slightly move forward because of creep torque. Creep torque causes the vehicle 102 to slowly inch forward without depression of the accelerator pedal 132.

The one or more vehicle components may include the accelerator pedal 132. The accelerator pedal 132 may be depressed to accelerate or increase the speed of the vehicle 102. When the accelerator pedal 132 is depressed, the vehicle 102 may move forward, and in the process, the vehicle 102 may override an existing creep torque to provide an applied torque, which causes the vehicle 102 to move forward when the accelerator pedal 132 is depressed.

Figure 2:
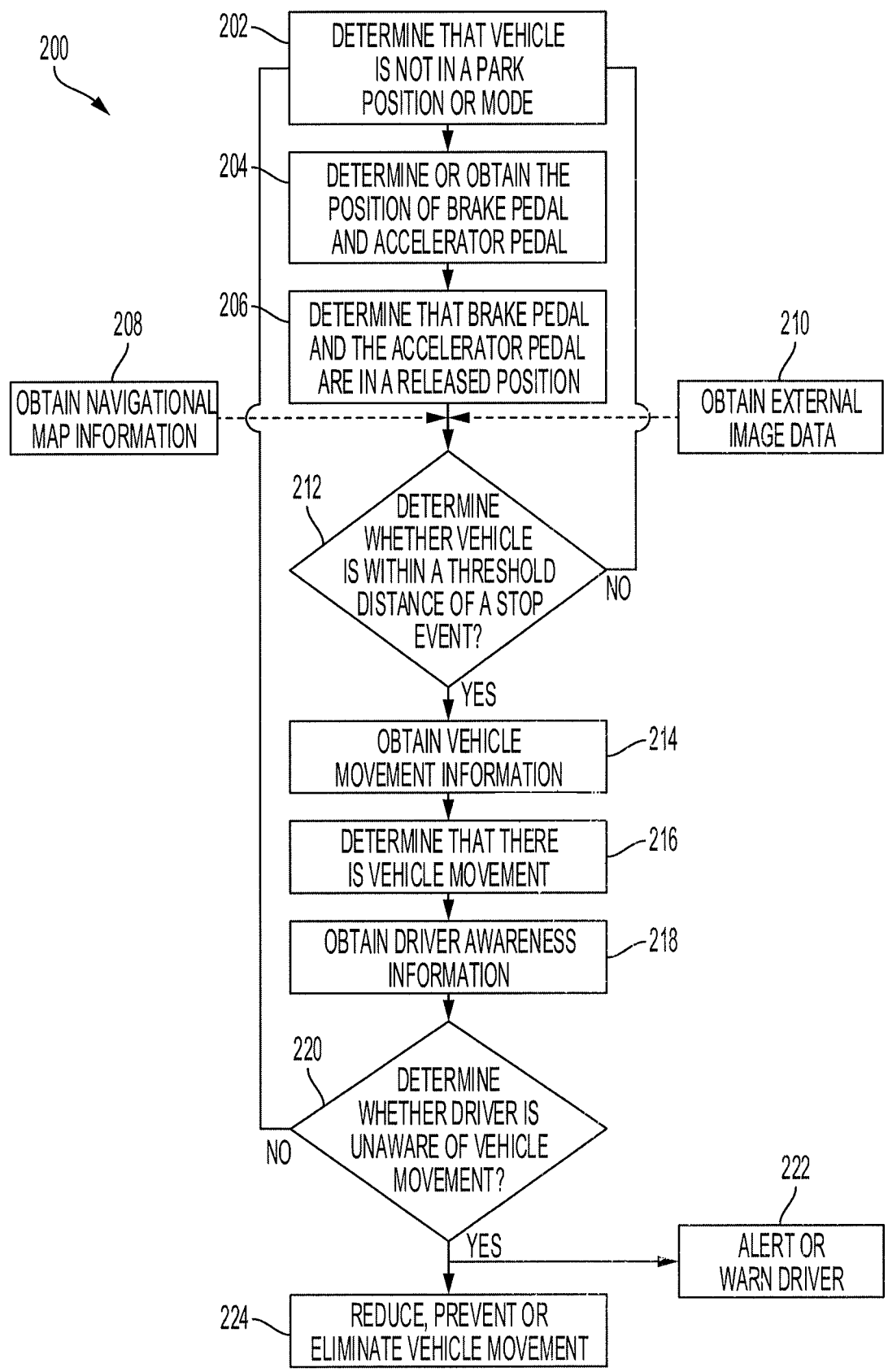
FIG. 2 is a flow diagram of an example process for triggering the reduction or elimination of vehicle movement when the driver is unaware using the brake assist control system of FIG. 1 according to an aspect of the invention.

FIG. 2 describes the process 200 for triggering the reduction or elimination of the vehicle movement, such as creep, when the driver is unaware of the vehicle movement. One or more computers or one or more data processing apparatuses, for example, the ECU 108 of the brake assist control system 100 of FIG. 1, appropriately programmed, may implement the process 200.

The brake assist control system 100 determines that the vehicle 102 is not in the park position or mode (202). In other words, the vehicle 102 may be in a drive mode or position. The position or mode of the vehicle 102 may hereinafter be referred to as the mode of the vehicle 102. The vehicle may have different modes including a park mode, a drive mode, a neutral mode, a reverse mode or other mode. The mode may be automatically selected based on a throttle position, vehicle speed and/or other factors including user input from a device that causes a gear shift, for example.

The vehicle 102 may be in another mode, such as the drive mode, the neutral mode or the reverse mode, and not in the park mode where the transmission 120 may be mechanically locked in position for parking the vehicle 102. The brake assist control system 100 may determine that the vehicle 102 is not in the park mode based on the user input, such as the position of the device that causes the gear shift, or using a sensor that determines a gear position.

The brake assist control system 100 determines or obtains the position of the brake pedal 130 and the accelerator pedal 132 (204). The brake assist control system 100 may use the brake pedal sensor 114a to measure, detect or determine the position of the brake pedal 130 and may use the accelerator pedal sensor 114b to measure, detect or determine the position of the accelerator pedal sensor 114b.

Once the positions of the brake pedal 130 and/or the accelerator pedal 132 are determined, the brake assist control system 100 may determine that the brake pedal 130 and the accelerator pedal 132 are in a released position (206). The brake pedal 130 is in the released position when the brake pedal 130 is not depressed, applied or otherwise engaged. The accelerator pedal 132 is in the released position when the accelerator pedal 132 is not depressed, applied or otherwise engaged. The brake assist control system 100 may determine that the brake pedal 130 and/or the accelerator pedal 132 are in released position based on the position of the obtained or determined position of the brake pedal 130 and/or the accelerator pedal 132, respectively.

The position of the brake pedal 130 and/or the accelerator pedal 132 may indicate whether the brake pedal 130 and/or the accelerator pedal 132 are in a released position and/or in an engaged or applied position. When the brake pedal 130 is not depressed, the brake pedal 130 is in the released position. Otherwise, the brake pedal 130 is partially or fully engaged and/or applied when the brake pedal 130 is partially or fully depressed, respectively. When the accelerator pedal 132 is not depressed, the accelerator pedal 132 is in the released position. Otherwise, the accelerator pedal 132 is partially or fully engaged and/or applied when the accelerator pedal 132 is partially or fully depressed, respectively.

The brake assist control system 100 may obtain navigational map information (208). The brake assist control system 100 may obtain the navigational map information using the navigation unit 112. The navigational map information may include the current location of the vehicle 102, the destination of the vehicle 102, and/or roadway information including the location and other related information, such as the type, of one or more stop events.

Moreover, the brake assist control system 100 may obtain external image data to determine the location of the vehicle relative to one or more stop events (210). The brake assist control system 100 may use a camera 114e to capture image data external to the vehicle 102. The external image data may be used to determine the location and/or type of one or more stop events and/or the current location of the vehicle 102. The external image data may also be used to determine a relative distance between the vehicle 102 and another object, such as another vehicle.

The brake assist control system 100 determines whether the vehicle 102 is within a threshold distance of a stop event using the external image data and/or the navigational map information or other sensor information (212). For example, the brake assist control system 100 may recognize an object, such as a stop sign, a traffic signal or a curb of a place of business or transportation hub. The brake assist control system 100 may extract and identify the object from the external image data or from another sensor information, such as a curb sensor which detects when the vehicle 102 is within a threshold distance of a curb. Once the brake assist control system recognizes the object, the brake assist control system 100 may determine that the vehicle 102 is at or near the stop event when the object is a particular object, such as a stop sign, the traffic signal or the curb. In another example, the brake assist control system 100 may extract the current location of the vehicle 102 and the locations of the one or more stop events from the navigational map information and determine that the current location of the vehicle 102 is within a threshold distance of the location of at least one of the one or more stop events, such as within approximately 100 feet of the location of a stop event. The threshold distance or proximity may be user-configured and/or pre-configured and may be adjusted or different for different types of stop events. For example, a curbside of an airport drop-off area may extend for hundreds of feet, whereas, a stopping area for a stop sign may extend only tens of feet, and thus, the threshold distance may be larger for a stop event associated with an airport than a stop event associated with a stop sign.

If the brake assist control system 100 determines that the vehicle 102 is not within the threshold distance of a stop event, the brake assist control system 100 may continue to monitor the mode of the vehicle 102 and the positions of the brake pedal 130 and/or the accelerator pedal 132 (202). If the brake assist control system 100 determines that the vehicle is within the threshold distance of the stop event, the brake assist control system 100 may obtain vehicle movement information to determine whether there is vehicle movement (214). In some implementations, the brake assist control system 100 checks for vehicle movement regardless of whether the current location of the vehicle 102 is within the threshold distance of the location of the stop event. In some implementations, the brake assist control system 100 checks for vehicle movement only when the stop event is of a particular type or category, such as near a curb. This allows the driver to creep forward for other stop events, such as a stop sign. The brake assist control system 100 may extract the type or category from the roadway information.

The brake assist control system 100 measures, detects or otherwise determines vehicle movement information. Vehicle movement information is information that indicates whether the vehicle 102 is moving. Vehicle movement information may include the speed of the vehicle 102, the amount of applied torque within an engine of the vehicle, and/or any movement of the wheels of the vehicle 102.

The brake assist control system 100 may use a vehicle speed sensor to measure the speed of the vehicle 102, for example. In some implementations, the brake assist control system 100 may measure, detect or otherwise determine that there is an applied torque using an engine sensor, for example, which may indicate that there is vehicle movement. In some implementations, the brake assist control system 100 may detect wheel movement, e.g., using a wheel sensor, and determine that there is vehicle movement when the wheel is moving.

The brake assist control system 100 determines that there is vehicle movement based on the vehicle movement information (216). If the speed of the vehicle 102 is greater than a threshold speed, such as 0.5 mph, the brake assist control system 100 may determine that the vehicle 102 is moving and that there is vehicle movement, for example. In another example, the brake assist control system 100 may determine that the applied torque is greater than a threshold amount, which indicates that the vehicle 102 is moving and that there is vehicle movement. In another example, the brake assist control system 100 may determine that the wheel of the vehicle 102 is turning more than a threshold amount of revolutions per minute, such as approximately 2 revolutions per minute, which indicates that the vehicle 102 is moving and that there is vehicle movement.

When there is vehicle movement, the brake pedal 130 and the accelerator pedal 132 are in the released position, and the vehicle 102 is not in the park mode, the brake assist control system 100 may obtain driver awareness information to determine whether the driver is unaware of the vehicle movement (218). The brake assist control system 100 uses one or more sensors 114 to obtain driver awareness information. The driver awareness information is information that is related to a driver's awareness and/or attention to the roadway and vehicle movement along the roadway. For example, the driver awareness information measures the attentiveness of the driver to the roadway and/or the vehicle movement.

The brake assist control system 100 may use a door sensor 114*c* to detect whether a door of the vehicle 102 is open, partially open or closed. The door sensor 114*c* may provide an indication of the position of the door, and if the door is ajar, this may indicate that the driver is unprepared to control vehicle operation and/or may indicate that the driver is not attentive to the roadway and/or vehicle movement. For example, when the door is ajar, the driver or other occupant may be entering or exiting the vehicle 102, and so, the driver is unprepared to control vehicle operation and/or is not paying attention to the roadway.

In some implementations, the brake assist control system 100 may use a camera 114*e* to capture image data and analyze the image data to determine that the driver is within the vehicle 102 and one or more eye positions of the driver of the vehicle 102. The camera 114*e* may recognize that the driver is within the vehicle 102 by comparing objects within the image data to previously-stored object representations, and if the driver is within the vehicle 102, the camera 114*e* may determine the eye positions of the driver, which may be used to determine whether the eye positions are facing toward the roadway the vehicle 102 is traversing, directed at a mirror or other position that indicates that the driver is attentive to the vehicle movement. Similarly, the brake assist control system 100 may use one or more hand sensors 114*f*, which may be positioned on the steering wheel, to determine hand positions of the driver. The one or more hand sensors 114*f* may indicate the hand positions of the driver to ensure that the hands of the driver are on the steering wheel, which may indicate that the driver is in control of the vehicle movement.

In some implementations, the brake assist control system 100 may use a seatbelt sensor 114*d* to detect whether the seatbelt of the driver is engaged or buckled. The seatbelt sensor 114*d* may provide an indication of the state of the seatbelt, and if the seatbelt is unbuckled, this may indicate that the driver is not ready or prepared to control vehicle operation when the driver is in the vehicle 102.

The brake assist control system 100 may obtain driver awareness information from multiple sources including a combination of the door sensor 114*c*, the seatbelt sensor 114*d*, the camera 114*e* and/or the hand sensor 114*f*. The brake assist control system 100 uses multiple sources to increase the accuracy and reliability of the information to determine whether the driver of the vehicle 102 is unaware of the vehicle movement. Other driver awareness information may include whether the driver of the vehicle 102 is on a connected personal device, using the radio or other entertainment media center. When the driver of the vehicle 102 is on the connected personal device, using the radio or other entertainment media center, the brake assist control system 100 may determine that the driver is unaware of the vehicle movement and/or the surroundings.

Once the driver awareness information is obtained, the brake assist control system 100 may determine whether the driver is unaware of the vehicle movement based on the driver awareness information (220). The driver awareness information may be obtained from a single source, such as a door sensor 114*c*, and/or from multiple sources, such as the seatbelt sensor 114*d*, the hand sensor 114*f* and/or the camera 114*e*. The brake assist control system 100 may weight the driver awareness information from each of the sources to calculate an overall driver awareness. For example, since the eye positions and hand positions of the driver are more indicative of driver awareness, the brake assist control system 100 may weight the indications of the eye positions and/or the hand positions more than the indications of the positions of the door and/or seatbelt when determining driver awareness of the vehicle movement. In another example, since when the door is ajar, the vehicle 102 should not move or the vehicle 102 would present a hazard to the driver, the occupant or other people in proximity to the vehicle 102, the brake assist control system 100 may override the other indicators and determine that the driver is unaware of the vehicle movement regardless of the other indicators.

In some implementations, the brake assist control system 100 calculates the overall driver awareness from the multiple sources and compares the overall driver awareness to a threshold level of awareness. The threshold level of awareness may be different for different drivers and be a value stored in a driver profile, for example. The brake assist control system 100 may identify the driver using the image data from the camera 114*e* or other user interface element, such as a key fob, and may obtain the value stored for the threshold level of awareness of the identified driver. If the overall driver awareness does not exceed the threshold level of awareness, the brake assist control system 100 may determine that the driver is unaware of the surroundings and/or the vehicle movement.

If the brake assist control system 100 determines that the driver is aware of the vehicle movement and/or the surroundings of the vehicle 102, the brake assist control system 100 returns to monitoring the position or mode of the vehicle along with the positions of brake pedal 130 and the accelerator pedal 132 (202). If the brake assist control system 100 determines that the driver is unaware of the vehicle movement and/or the surroundings, the brake assist control system 100 may alert or warn the driver and/or occupants of the vehicle 102 (222). The brake assist control system 100 may use the user interface 118 to display a notification to the driver and/or the occupant that indicates that the vehicle 102 is creeping or slowly moving forward. In some implementations, the brake assist control system 100 may use an audio or other visual indicator to alert the driver and/or the occupant that the vehicle 102 is creeping or slowly moving forward. The alert or warning may occur prior to and/or during the reduction or elimination of the vehicle movement.

Figure 3:
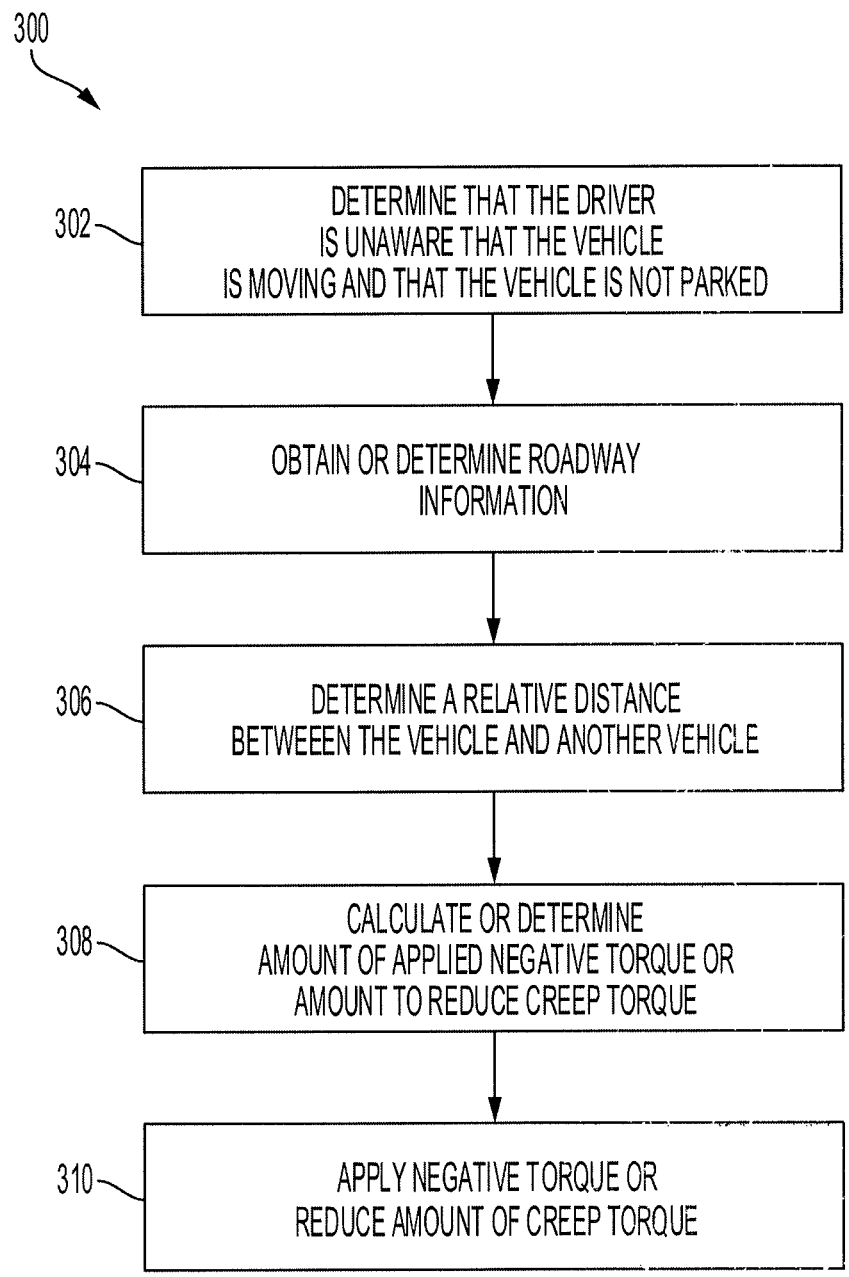
FIG. 3 is a flow diagram of an example process for reducing or eliminating the vehicle movement when the driver is unaware of the vehicle movement using the brake assist control system of FIG. 1 according to an aspect of the invention.

In response to determining that the driver is unaware, that the vehicle is not in the park position and the brake pedal 130 is in the released position, the brake assist control system 100 applies a negative torque, reduces the torque or eliminates the torque to reduce, prevent or eliminate the vehicle movement (224). In some implementations, the brake assist control system 100 may alert or warn the driver prior to reducing or eliminating the vehicle movement, and after the brake assist control system 100 alerts or warns the driver, the brake assist control system 100 may reduce or eliminate the vehicle movement after a period of time has elapsed, such as approximately 10 seconds in which the driver remains unaware of the vehicle movement. FIG. 3 further describes the process 300 for reducing or eliminating the vehicle movement.

FIG. 3 describes the process 300 reducing or eliminating the vehicle movement when the driver is unaware of the vehicle movement. One or more computers or one or more data processing apparatuses, for example, the ECU 108 of the brake assist control system 100 of FIG. 1, appropriately programmed, may implement the process 300. When there is vehicle movement, such as creep, the driver is unaware, the vehicle 102 is not in the park position and the brake pedal 130 is not applied, the brake assist control system 100 reduces or eliminates the vehicle movement. The brake assist control system 100 may reduce or eliminate the creep torque or apply a negative or deceleration torque to reduce or eliminate the vehicle movement.

The brake assist control system 100 determines that the driver is unaware that the vehicle 102 is moving and that the vehicle 102 is not parked, as described above (302). When the vehicle is not in the park position and that the brake pedal 130 is not applied, the brake assist control system 100 monitors the driver awareness and initiates the vehicle movement reduction or elimination when the driver is unaware of any vehicle movement to prevent an accident.

The brake assist control system 100 may obtain roadway information to determine the angle, the grade or the level of the surface of the roadway (304). The roadway information may include an angle, a grade or a level of incline of the surface of the roadway that the vehicle is on or traversing. The brake assist control system 100 may obtain navigational map information that includes the current location of the vehicle 102, the one or more locations of the stop events and the roadway information near the one or more locations of the stop events. The brake assist control system 100 may extract the roadway information including the angle, the grade or the level of the incline of the surface of the roadway that is associated with the location of the stop event from the navigational map information. In particular, the brake assist control system 100 may extract the angle, the grade or the level of incline of the surface of the roadway that is within a threshold distance of the current location of the vehicle 102. In some implementations, the brake assist control system 100 may use one or more sensors 114, such as the road incline sensor, to measure or detect a grade, an angle or an incline of a surface of a roadway that the vehicle 102 is on or traversing.

The brake assist control system 100 may determine a relative distance between the vehicle 102 and another vehicle (306). The brake assist control system 100 may use one or more sensors 114, such as the proximity sensor, to determine the relative distance between the vehicle 102 and another vehicle, such as a vehicle in front of the vehicle 102 when the vehicle 102 is creeping or moving forward. The brake assist control system 100 may use the relative distance to control the amount of applied negative torque and/or the amount of reduction of the creep torque to reduce or eliminate the vehicle movement.

The brake assist control system 100 may calculate, adjust or otherwise control the amount of applied negative torque and/or the amount to reduce the creep torque based on the relative distance between the vehicle 102 and the other vehicle, the roadway information, other additional information and/or a combination thereof (308). For example, if the vehicle 102 is within a first threshold distance, such as approximately 2 feet-3 feet, of another vehicle, the vehicle 102 may reduce the amount of creep torque by a first amount, such as approximately 15%-20% of the normal creep torque. If the vehicle 102 is within a second threshold distance, such as approximately 3 feet-4 feet, the vehicle 102 may reduce the amount of creep torque by a second amount that is less than the first amount, such as approximately 5%-10% of the normal creep torque because the second threshold distance is farther away than the first threshold distance. In this instance when the threshold distance is farther away, the driver has a larger error of margin before the vehicle 102 may impact the other vehicle. That is, the amount of reduction of the creep torque may be indirectly correlated or proportional to the amount relative distance between the vehicle 102 and the other vehicle. As the relative distance increases, the amount of reduction of creep torque may decrease, and as the relative distance decreases, the amount of reduction of creep torque may increase.

Figure 4A:
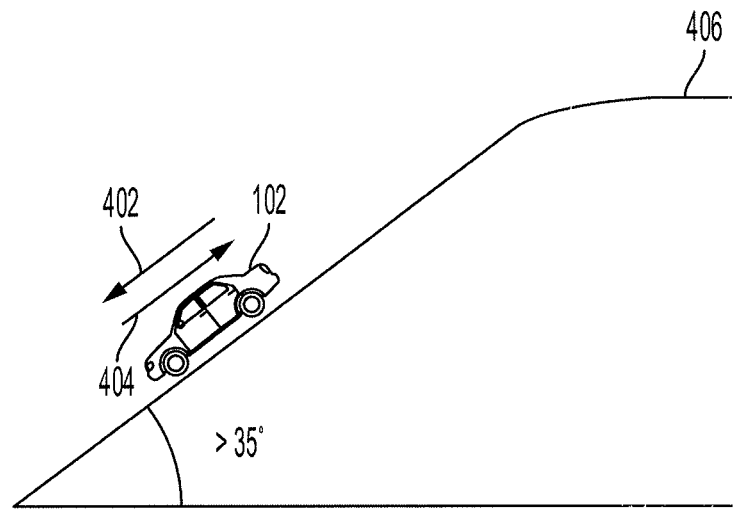
FIG. 4A shows the vehicle using the brake assist control system of FIG. 1 on a surface of a roadway with a sharp incline according to an aspect of the invention.
Figure 4B:
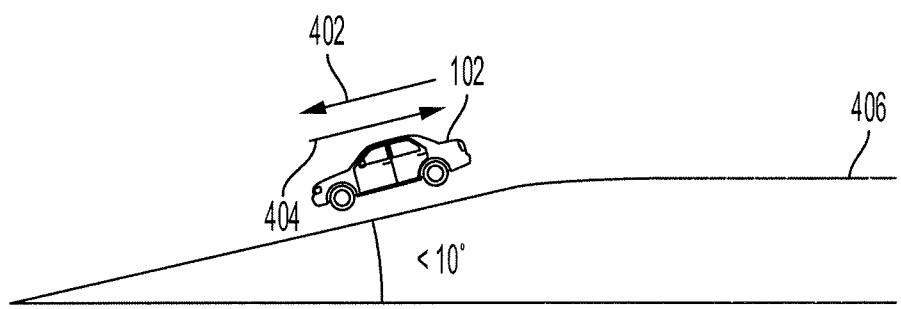
FIG. 4B shows the vehicle using the brake assist control system of FIG. 1 on a surface of a roadway with a gradual or gentle incline according to an aspect of the invention.

In another example, if the vehicle 102 is on the surface of a roadway 406 that is angled sharply, such as at a downward angle greater than approximately 35 degrees, as shown in FIG. 4A for example, the vehicle 102 may experience a greater creep torque or vehicle movement in the direction 402 than if the vehicle 102 is on a surface of a roadway 406 that is flat or that is angled less sharply, such as at a downward angle less than approximately 10 degrees, as shown in FIG. 4B for example. Moreover, since the vehicle 102 is on a downward angled surface of the roadway 406, the brake assist control system 100 may determine that a negative torque is necessary to counteract the gravitational force downward due the incline of the roadway 406. Thus, the braking assist control system 100 may compensate for the angled roadway and provide a negative torque to negate or reduce the creep torque forward so that the vehicle 102 does not move forward.

The amount of the negative torque may be directly correlated and/or proportional to the degree of the angle of the roadway 406. As the degree of the angle of the roadway 406 that the vehicle 102 is on increases, the amount of negative torque in the direction 404 necessary to prevent the vehicle movement increases. As the degree of the angle of the roadway decreases or becomes flatter, the amount of negative torque in the direction 404 necessary to prevent the vehicle movement decreases. The brake assist control system 100 may limit the amount of applied negative torque based on a threshold to ensure that the vehicle 102 does not move backward because of the applied negative torque.

In some implementations, the brake assist control system 100 stores a mapping within the memory 110. The mapping maps or associates different factors to an amount of negative torque to be applied or an amount of creep torque to reduce. The different factors include the relative distance between the vehicle 102 and the other vehicle and the angle or the incline of the surface of the roadway.

In some implementations, the brake assist control system 100 may use other additional information to calculate or determine the amount of negative torque to apply or the amount of torque to reduce or eliminate the vehicle movement. The other additional information may include weather information or other road condition information. The brake assist control system 100 may obtain the weather information from the external database 104. For example, the weather information may include the weather, such as the amount of precipitation, around the current location of the vehicle 102. The brake assist control system 100 may determine that there is precipitation at the current location of the vehicle and may determine that more negative torque is necessary to reduce or eliminate the vehicle movement when there is precipitation on the surface of the roadway, for example. In some implementations, the amount of negative torque to be applied and/or the amount of torque to be reduced or eliminated is use-configured or controlled by user input, such as approximately 5%-10% of torque to be reduced.

The brake assist control system 100 applies a negative torque when the vehicle 102 is on an incline or reduces the amount of creep torque when the vehicle 102 is not on the incline to reduce or eliminate the vehicle movement (310). When the brake assist control system 100 determines that the angle of the surface of the roadway is greater than a threshold angle, such as more than 3 degrees, the brake assist control system 100 may determine that a negative torque is necessary to counteract a gravitational force, for example. The brake assist control system 100 applies the negative torque based on the calculated or determine amount of negative torque. When the brake assist control system 100 determines that the angle of the surface of the roadway is less than the threshold angle, the brake assist control system 100 may determine that the negative torque is not necessary, and instead, the brake assist control system 100 may reduce or eliminate the creep torque to reduce or eliminate the vehicle movement. The brake assist control system 100 reduces the creep torque based on the calculated or determined amount of creep torque to be reduced. The brake assist control system 100 may apply the brake pedal 130, downshift and/or apply a negative torque on the motor and/or generator 128 to generate the negative torque or to reduce the amount of creep torque.

Figure 5:
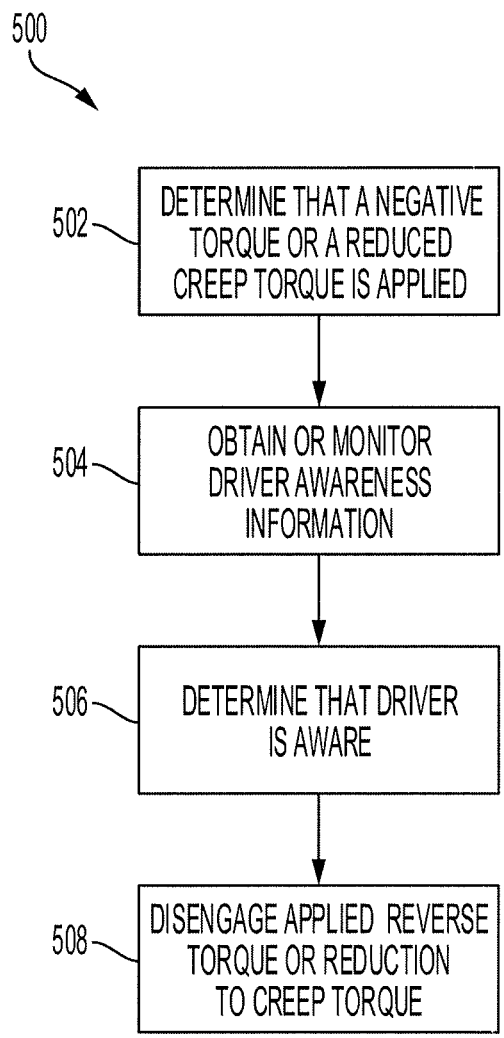
FIG. 5 is a flow diagram of an example process for cancelling the reduction or elimination of the vehicle movement when the driver is aware of the vehicle movement using the brake assist control system of FIG. 1 according to an aspect of the invention.

FIG. 5 describes the process 500 cancelling the reduction or elimination of the vehicle movement when the driver is aware of the vehicle movement. One or more computers or one or more data processing apparatuses, for example, the ECU 108 of the brake assist control system 100 of FIG. 1, appropriately programmed, may implement the process 500. When the driver becomes aware of the surroundings, the brake assist control system 100 may cancel the reduction or elimination of the vehicle movement, such as the creep torque.

The brake assist control system 100 may determine that a negative torque is being applied or a reduction of the creep torque is being applied when there is vehicle movement and the driver is unaware of the vehicle movement, as described above (502). While the brake assist control system 100 applies the negative torque or the reduction of the creep torque, the brake assist control system 100 continues to obtain or monitor driver awareness information, as described above (504). The brake assist control system 100 may use the one or more sensors 114 to monitor the driver of the vehicle 102. For example, the brake assist control system 100 may use the door sensor 114c to monitor the position of the vehicle 102, the seatbelt sensor 114d to monitor the state of the seatbelt, the camera 114e to monitor the eye positions of the driver and/or the hand sensor 114f to monitor hand positions of the driver on the steering wheel.

The brake assist control system 100 determines that the driver is aware of the surroundings and/or vehicle movement based on the driver awareness information (506). For example, if the brake assist control system 100 determines that two hands are on the steering wheel, eye positions of the driver are looking forward ahead of the vehicle, the door is closed, the seatbelt is locked or buckled and/or a combination thereof, the brake assist control system 100 may determine that the driver is aware of the surroundings and/or vehicle movement.

In some implementations, the brake assist control system 100 may receive user input that indicates that the driver is aware. For example, the user interface 118 may receive a confirmation of a notification that is displayed to the driver. The user interface 118 may initially display an alert or warning to the driver that the driver is unaware of the vehicle movement. The alert or warning may include a request for confirmation to affirm that the driver has become aware. Once the brake assist control system 100 receives the confirmation, e.g., a selection of a button on the alert or warning, the brake assist control system 100 may determine that the driver is now aware of the vehicle movement and/or surroundings.

When the driver becomes aware of the surroundings and/or vehicle movement, the brake assist control system 100 may disengage the applied negative torque or the applied reduction to the creep torque (508). The brake assist control system 100 may require that the driver be aware for a period of time before the brake assist control system 100 disengages the applied negative torque or the applied reduction to the creep torque. The disengagement of the applied negative torque or the applied reduction to the creep torque may be in response to user input that confirms that the driver is now aware of the vehicle movement and/or surroundings.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A brake assist control system for a vehicle, comprising:
a first sensor configured to detect an eye or a hand position of a driver of the vehicle, a door position of the vehicle or an engagement of a seatbelt; and
an electronic control unit coupled to the first sensor, the electronic control unit configured to:
determine that a brake pedal and an accelerator pedal are in a released position based on a position of the brake pedal and a position of the accelerator pedal, respectively,
determine that there is vehicle movement,
determine that a driver of the vehicle is unaware of the vehicle movement based on the eye or the hand position of the driver of the vehicle, the door position of the vehicle or the engagement of the seatbelt, and
reduce or eliminate creep torque of the vehicle when the driver is unaware of the vehicle movement.

2. The brake assist control system of claim 1, further comprising:
a brake pedal sensor coupled to the brake pedal and configured to detect the position of the brake pedal; and
an accelerator pedal sensor coupled to the accelerator pedal and configured to detect the position of the accelerator pedal.

3. The brake assist control system of claim 1, further comprising:

a second sensor including at least one of an engine sensor configured to detect an applied torque or power to an engine of the vehicle, a vehicle speed sensor configured to detect a speed of the vehicle, or a wheel sensor configured to detect movement of a wheel of the vehicle;

wherein to determine that there is vehicle movement, the electronic control unit is configured to determine that the vehicle is creeping or moving forward based on the applied torque or power to the engine of the vehicle, the speed of the vehicle, or the movement of the wheel of the vehicle.

4. The brake assist control system of claim 1, wherein the first sensor is a door sensor configured to detect the door position of the vehicle, wherein to determine that the driver of the vehicle is unaware of the vehicle movement the electronic control unit is configured to determine that a door of the vehicle is ajar based on the door position.

5. The brake assist control system of claim 1, further comprising:

a navigation unit configured to detect a current location of the vehicle and a location of a traffic sign or a traffic signal;

wherein the electronic control unit is further configured to:

obtain, from an external database, the location of the traffic sign or the traffic signal; and determine that the current location of the vehicle is within a threshold distance of the location of the traffic sign or the traffic signal.

6. The brake assist control system of claim 1, further comprising:

a second sensor configured to an incline or an angle of a roadway;

wherein to reduce or eliminate the creep torque of the vehicle, the electronic control unit is configured to:

reduce or eliminate the creep torque when the incline or the angle of the roadway is greater than a threshold angle.

7. The brake assist control system of claim 1, wherein the electronic control unit is configured to:

determine that the vehicle is not in a park position based on a position of a transmission of the vehicle; and wherein the electronic control unit is configured to reduce or eliminate the creep torque of the vehicle in response to determining that the vehicle is not in the park position and determining that there is vehicle movement.

8. A brake assist control system, comprising:
a brake pedal;
an accelerator pedal;
a brake pedal sensor coupled to the brake pedal and configured to detect a position of the brake pedal;
an accelerator pedal sensor coupled to the accelerator pedal and configured to detect a position of the accelerator pedal;
a transmission;
a first sensor configured to detect an eye or a hand position of a driver of a vehicle, a door position of the vehicle or an engagement of a seatbelt; and
an electronic control unit coupled to the brake pedal sensor, the accelerator pedal sensor and the brake pedal sensor, the electronic control unit configured to:
determine that the brake pedal and the accelerator pedal are in a released position based on the detected position of the brake pedal and the detected position of the accelerator pedal, respectively,
determine that there is vehicle movement and that the transmission is in a drive position,
determine that the driver of the vehicle is unaware of the vehicle movement based on the eye or the hand position of the driver of the vehicle, the door position of the vehicle or the engagement of the seatbelt, and
apply a negative or deceleration torque to reduce or eliminate the vehicle movement when the driver is unaware of the vehicle movement.

9. The brake assist control system of claim 8, further comprising:

a second sensor including at least one of an engine sensor configured to detect an applied torque or power to an engine of the vehicle, a vehicle speed sensor configured to detect a speed of the vehicle, or a wheel sensor configured to detect movement of a wheel of the vehicle;

wherein to determine that there is vehicle movement, the electronic control unit is configured to determine that the vehicle is creeping or moving forward based on the applied torque or power to the engine of the vehicle, the speed of the vehicle, or the movement of the wheel of the vehicle.

10. The brake assist control system of claim 8, wherein the first sensor is a seatbelt sensor configured to detect the engagement of the seatbelt, wherein to determine that the driver of the vehicle is unaware of the vehicle movement the electronic control unit is configured to determine that the seatbelt is disengaged.

11. The brake assist control system of claim 8, further comprising:

a navigation unit configured to detect a current location of the vehicle and one or more stop locations;

wherein the electronic control unit is further configured to:

determine that the current location of the vehicle is within a threshold distance of the one or more stop locations; and determine that there is vehicle movement while the vehicle remains within the threshold distance of the one or more stop locations.

12. The brake assist control system of claim 8, further comprising:

a second sensor configured to an incline or an angle of a roadway;

wherein the electronic control unit is configured to:

apply the negative or deceleration torque when the incline or the angle of the roadway is greater than a threshold angle, wherein an amount of the applied negative or deceleration torque is proportional to an amount of the incline or the angle of the roadway.

13. The brake assist control system of claim 8, wherein the electronic control unit is configured to apply the negative or deceleration torque in response to determining that the transmission is in the drive position and determining that there is vehicle movement.

14. A method for controlling vehicle movement of a vehicle, comprising:

determining, by a processor and using a brake pedal sensor, that a brake pedal is in a released position;

determining, by the processor and using an accelerator pedal sensor, that an accelerator pedal is in a released position;

determining, by the processor, that the vehicle is in drive and that there is vehicle movement;

determining, by the processor and using a sensor, that a driver of the vehicle is unaware of the vehicle movement based on an eye or a hand position of the driver of the vehicle, a door position of the vehicle or an engagement of a seatbelt; and reducing or eliminating, by the processor, creep torque of the vehicle when the driver is unaware of the vehicle movement.

15. The method of claim 14, further comprising:

detecting an applied torque or power to an engine of the vehicle, a speed of the vehicle, or a movement of a wheel of the vehicle;

wherein determining that there is vehicle movement includes determining that the vehicle is creeping or moving forward based on the applied torque or power to the engine of the vehicle, the speed of the vehicle, or the movement of the wheel of the vehicle.

16. The method of claim 14, wherein determining that the driver of the vehicle is unaware of the vehicle movement includes detecting that the driver of the vehicle does not have two hands on a steering wheel of the vehicle or that eyes of the driver of the vehicle are not facing forward.

17. The method of claim 14, further comprising:

alerting or warning the driver of the vehicle that there is vehicle movement; and reducing or eliminating the creep torque of the vehicle after a period of time after alerting or warning the driver of the vehicle that there is vehicle movement.

18. The method of claim 14, further comprising:

determining or obtaining, by a processor, a current location of the vehicle and one or more locations of one or more stop events; and determining that there is vehicle movement while the vehicle remains within a threshold distance of the one or more stop locations.

19. The method of claim 14, further comprising:

determining a relative distance between the vehicle and another vehicle;

and reducing or eliminating, by the processor, the creep torque of the vehicle based on the determined relative distance.

20. The method of claim 14, wherein reducing or eliminating the creep torque includes reducing or eliminating any applied torque or applying a negative or deceleration torque.

* * * * *